United States Patent [19]

Schlichenmaier et al.

[11] Patent Number: 5,120,114
[45] Date of Patent: Jun. 9, 1992

[54] BRAKE SYSTEM FOR TRACTOR OR TOWING VEHICLES

[75] Inventors: Andreas Schlichenmaier, Zaberfeld; Heinz Kaechele, Rutesheim, both of Fed. Rep. of Germany

[73] Assignee: Robert Bosch GmbH, Stuttgart, Fed. Rep. of Germany

[21] Appl. No.: 437,859

[22] Filed: Nov. 17, 1989

[30] Foreign Application Priority Data

Feb. 10, 1989 [DE] Fed. Rep. of Germany ....... 3903930

[51] Int. Cl.$^5$ .............................................. B60T 8/32
[52] U.S. Cl. ............................... 303/100; 188/112 A; 188/112 R; 303/7; 303/20; 303/15
[58] Field of Search .................. 303/3, 7, 15, 20, 100, 303/106, 102, 105, 95, 110, 113, 113 AP; 188/112 A, 112 R; 180/197

[56] References Cited

U.S. PATENT DOCUMENTS

| | | | |
|---|---|---|---|
| 3,767,270 | 10/1973 | Urban | 303/7 X |
| 3,804,471 | 4/1974 | Fish | 303/7 X |
| 3,993,362 | 11/1976 | Kamins et al. | 303/7 X |
| 4,077,675 | 3/1978 | Leiber et al. | 303/95 |
| 4,254,998 | 3/1981 | Marshall et al. | 303/20 |
| 4,370,715 | 1/1983 | Leiber | 364/426 |
| 4,836,616 | 6/1989 | Roper et al. | 303/7 |

FOREIGN PATENT DOCUMENTS 3626753  2/1988  Fed. Rep. of Germany .

Primary Examiner—Matthew C. Graham
Attorney, Agent, or Firm—Edwin E. Greigg; Ronald E. Greigg

[57] ABSTRACT

A brake system including an anti-skid apparatus with an electronic control unit for monitoring the grip of the vehicle tires on the road. It is also equipped with a yawing moment attenuator, controlled by the control unit, that in the event of highly varying coefficients of friction prevents an excessively great difference in brake pressure on the two sides of the vehicle. Tractor or towing vehicles driven without the trailer, especially semitrailer trucks, are difficult to control on road surfaces with variable grip, because of the major yawing and steering moments. The tractor or towing vehicle is therefore equipped according to the invention with a trailer detection unit, the signal of which is evaluatable in the control unit and can be fed as a control variable to the yawing moment attenuator. If the truck is driven without a trailer, the yawing moment attenuator can be controlled on the basis of this signal in such a way as to lessen the difference in brake pressure.

1 Claim, 1 Drawing Sheet

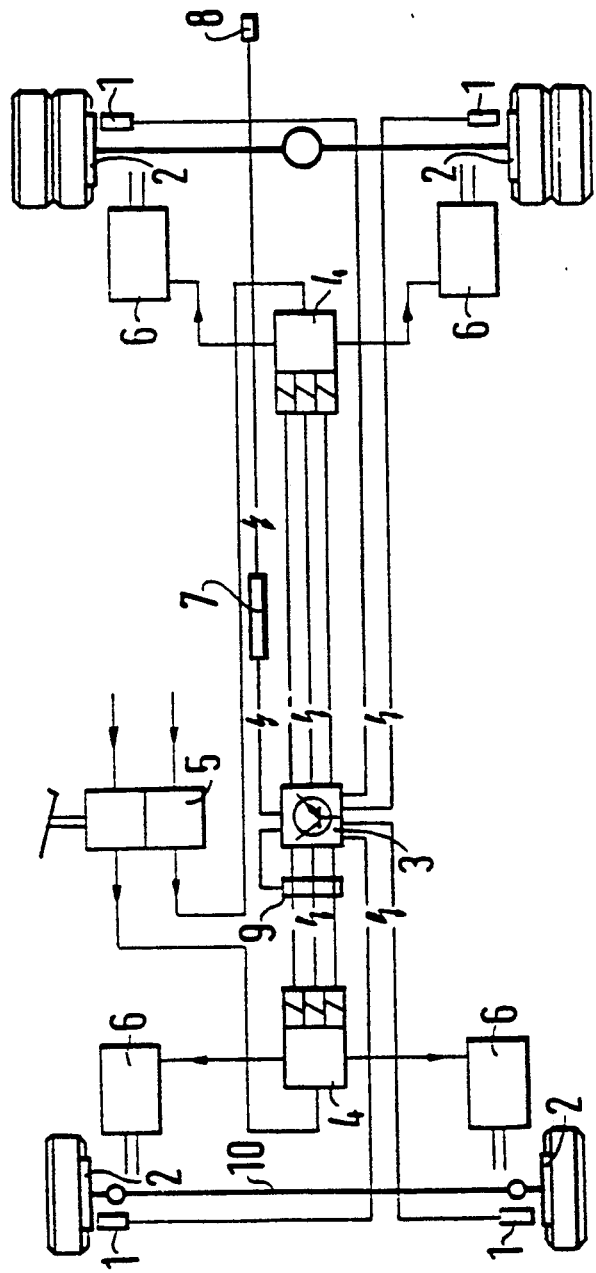

BRAKE SYSTEM FOR TRACTOR OR TOWING VEHICLES

BACKGROUND OF THE INVENTION

The invention is based on a vehicle brake system for a tractor or towing vehicle as defined herein. Such a brake system is known from German Offenlegungsschrift 36 26 753, which describes a vehicle provided with an axle load transducer. The sensor signal determined by the axle load transducer is dependent on the load carried by the vehicle and is evaluated in an electronic control unit and fed to a yawing moment attenuator as a control variable. The attenuator varies the brake pressure difference bewteen the brake cylinders of the two sides of the vehicle in such a way that the brake pressure difference in an unloaded vehicle, which is subjected t major yawing and steering moment when braking on a changing surface (for example where there is ice on the edge of the road while the middle of the road has good grip), is kept lower than in a loaded vehicle. Contrarily, vehicles without load-dependent yawing moment control are harder for the driver to control during braking under such conditions, especially if the wheel base is short.

OBJECT AND SUMMARY OF THE INVENTION

The vehicle brake system according to the invention as defined herein has an advantage over the prior art that even in vehicles equipped for pulling trailers, and having a trailer detection unit, the effect of yawing moment can still be lessened in a simple manner. This means that especially in semitrailer trucks driven without the trailer the danger of overturning is reduced.

The invention will be better understood and further object and advantages thereof will become more apparen from the ensuing detailed description of a preferred embodiment taken in conjunction with the drawing.

BRIEF DESCRIPTION OF THE DRAWING

The single figure of the drawing shows an exemplary embodiment of a brake system for tractor or towing vehicles, in particular semitrailer trucks, having a anti-skid apparatus.

DESCRIPTION OF THE PREFERRED EMBODIMENT

The anti-skid apparatus shown in the drawing detects the speed of the various wheels of the vehicle, which are assigned fixed rpm sensors 1. These sensors cooperate with a pulse ring 2 mounted on the wheel hub. The revolving pulse rings 2 generate pulses in the rpm sensors 1 which are transmitted as electrical signals, the frequency of which is proportional to the rpm of the wheel. The rpm sensor signals are directed to an electronic control unit 3 for monitoring the signals due to rpm of the wheels and for monitoring the grip of the wheels on the road and calculates both the wheel speeds and the wheel acceleration and wheel deceleration. An electronic control such as used herein is well known and has been set forth in U.S. Pat. Nos. 4,370,715 and 4,077,675. The slip of the wheels ascertained from these data by the control unit 3 in braking is used to control the electromagnetic magnets of pressur control valves 4 for each of the wheel brakes. The brake pressure fed into each of the brakes of each wheel via the control valves 4 by a service brake valve 5 is regulated in accordance with the dictates of the electronic control unit 3 in such a way that the tension force generated in the brake cylinder 6 brakes the respective wheels without locking them.

The tractor or towing vehicle also has a trailer detection unit 7 of a known design. This unit informs the driver whether a trailer (not shown in the drawing) is or is not equipped with an anti-skid braking system. If the vehicle is a semitrailer truck the trailer detection unit 7 can be connected to the semitrailer via a plug-in connection 8. In the tractor or towing vehicle, the trailer detection unit 7 is connected to the electronic control unit 3 of th anti-skid apparatus.

The control unit 3 also has an associated yawing moment attenuator 9, which prevents an excessively great difference in brake pressure on the two sides of the vehicle, and in particular of the steering axle 10, if the tire grip with the road is highly variable, because there is ice o the edge of the road while the middle of the road has good grip for example. This means that in braking on such a road surface, the yawing and steering moments acting on the truck can be reduced.

The trailer detection unit 7 cooperates with the electronic control unit 3 to monitor the grip of the wheels on the road surface and with the yawing moment attenuator 9 in the following way:

In trailerless operation, the trailer detection unit 7 generates a signal that is supplied to the control unit 3, which generates a signal that as a control variable influences the yawing moment attenuator 9 in such a way that if the truck is being driven without the trailer on a road surface having different coefficients of friction on the two sides of the truck, the brake pressure difference between the right and left brake cylinders 6 is kept lower than in the case where the truck is driven with the trailer.

The foregoing relates to a preferred exemplary embodiment of the invention, it being understood that other variants and embodiments thereof ar possible within the spirit and scope of the invention, the latter being defined by the appended claims.

What is claimed and desired to be secured by letters patent of the United States is:

1. A vehicle brake control system for assembly on a tractor having two braking sides including brakes, wheel sna dtires on each of said two sides, comprising an antiskid apparatus including an electronic control unit (3) on said tractor for monitoring a grip of the vehicle tires on the road, a yawing moment attenuator (9) controlled by said control unit (3), said yawing moment attenuator in the rpesence of highly varying coefficients of friction prevents an excessively great difference in brake pressure on the brakes on the two sides of the vehicle, a trailer detection unit (7) for detecting the absence of a trailer, said trailer detection unit (7) in absence of a trailer provides a signal which is directed into said control uni which is evaluated in said control unit (3), and said control unit provides an output signal that is delivered as a control variable to the yawing moment attenuator (9) relative to a signal of the trailer detection unit (7) representative of the absence of a trailer on he basis of which said yawing moment attenuator (9) is controllable in such a way as to lessen a difference in brake pressure on the brakes on opposite sides of said vehicle.

* * * * *